United States Patent [19]

Henttonen

[11] Patent Number: 4,583,880
[45] Date of Patent: Apr. 22, 1986

[54] CULTIVATION PLANT AND USE THEREOF

[76] Inventor: Martti W. Henttonen, Bergogatan 7, S-253 72 Helsingborg, Sweden

[21] Appl. No.: 763,064

[22] PCT Filed: Oct. 6, 1982

[86] PCT No.: PCT/SE82/00319

§ 371 Date: Jun. 16, 1983

§ 102(e) Date: Jun. 16, 1983

[87] PCT Pub. No.: WO83/01364

PCT Pub. Date: Apr. 28, 1983

Related U.S. Application Data

[63] Continuation of Ser. No. 510,443, Jun. 16, 1983.

[30] Foreign Application Priority Data

Oct. 19, 1981 [SE] Sweden ................... 8106153

[51] Int. Cl.⁴ ............................................. A01G 27/00
[52] U.S. Cl. ....................................................... 405/36
[58] Field of Search .............................. 405/36, 43–45, 405/40–41; 47/48.5; 239/145, 542

[56] References Cited

U.S. PATENT DOCUMENTS

| | | | |
|---|---|---|---|
| 547,123 | 10/1895 | Lee | 47/47.5 |
| 640,077 | 12/1899 | Bagby | 47/48.5 X |
| 1,173,534 | 2/1916 | Ryan | 47/47.5 |
| 1,200,869 | 10/1916 | Rife | 47/48.5 X |
| 1,401,386 | 12/1921 | Woodberry | 47/48.5 X |
| 2,052,020 | 8/1936 | Black | 47/47.5 |
| 2,237,793 | 4/1941 | Rudd | 401/203 |
| 2,309,233 | 1/1943 | Blads | 47/47.5 |
| 2,350,721 | 6/1944 | Brown | 47/47.5 |
| 2,653,449 | 9/1953 | Stauch | 47/48.5 X |
| 2,798,768 | 7/1957 | Babin | 47/48.5 X |
| 2,817,956 | 12/1957 | Young | 47/1 |
| 3,046,747 | 7/1962 | Timpe | 47/1 |
| 3,068,616 | 12/1962 | Katsusuke | 47/1 |
| 3,220,194 | 11/1965 | Lienard | 47/48.5 X |
| 3,274,730 | 9/1966 | Bose | 47/1 |
| 3,403,519 | 10/1968 | Balko | 405/45 |
| 3,408,818 | 11/1968 | Hemphill | 405/44 X |
| 3,440,822 | 4/1969 | Hegler | 405/45 |
| 3,443,385 | 5/1969 | Vallmer | 47/48.5 X |
| 3,518,831 | 7/1970 | Tibbals et al. | 47/48.5 X |
| 3,754,352 | 8/1973 | Bates | 47/48.5 |
| 3,797,738 | 3/1974 | Fitzhugh | 47/48.5 |
| 4,060,991 | 12/1977 | Reese | 47/48.5 X |
| 4,117,685 | 10/1978 | Skaife | 47/48.5 X |
| 4,322,179 | 3/1982 | Lamphier et al. | 405/43 X |

FOREIGN PATENT DOCUMENTS 560063 9/1932 Fed. Rep. of Germany ....... 47/48.5

*Primary Examiner*—Robert A. Hafer
*Assistant Examiner*—Danton DeMille
*Attorney, Agent, or Firm*—McCormick, Paulding & Huber

[57] ABSTRACT

A cultivation plant comprising several separate water accumulators (1) which are buried under a ground area (5) in which plants are to be grown, and which water accumulators are formed as a closed container (11) which is filled with a porous, water-soaking substrate (13) which opens to the ground to be irrigated over openings (12) at the top or at the side of the water accumulator (1). Each water accumulator is separately connected to a central force for supply of water and for supply of air. When using the cultivation plant water is supplied to the porous, water-soaking substrate (13) until the substrate has reached a predetermined maximum degree of moisture, whereafter the water supply is ceased, whereas air is supplied to the substrate (13) at a pressure which is slightly higher than the static pressure of the substrate, so that the air is forced through the substrate and out into the irrigated ground for oxygenating same. Water and air supply can be made alternating or concurrently, whereby the supply of air is continued even after the supply of water has been ceased.

1 Claim, 7 Drawing Figures

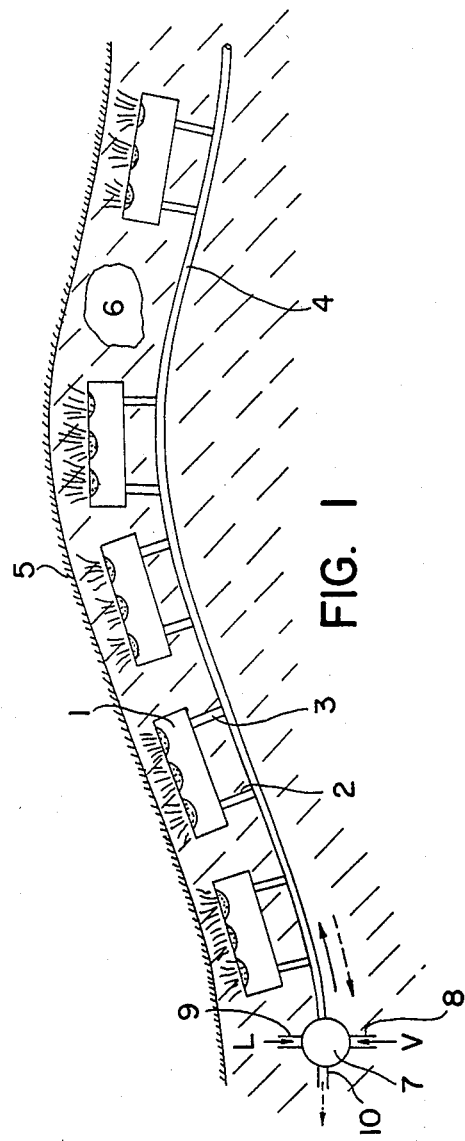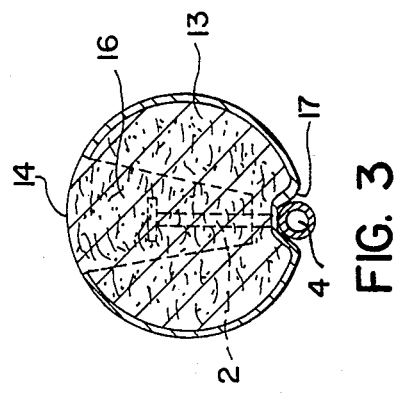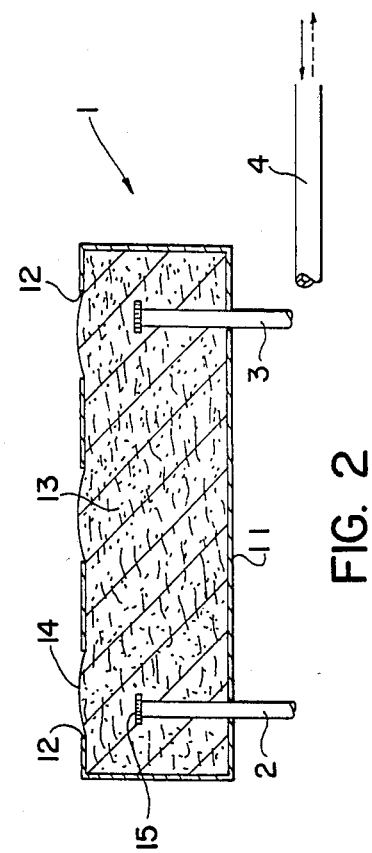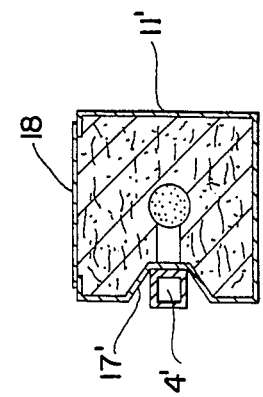

CULTIVATION PLANT AND USE THEREOF

This is a continuation of co-pending application Ser. No. 510,443 filed on June 16, 1983.

The present invention relates to a cultivation plant of the type comprising means buried in the ground for providng an artificial irrigation of plants above and at least slightly aside of the irrigation means buried in the ground.

An apparatus of the said type is known for instance from the German laid open publication No. 2 610 384. The known apparatus comprises a number of interconnected tanks which are partly filled with water and which can successively be refilled from a central source of water. A wick is from above introduced in the water tanks, and the wick is intended to soak up water and to emit moisture to the ground above and aside of the respective water tank.

The known apparatus is disadvantageous in some respects. A fresh wick has a relatively good ability of soaking up water, sometimes even too a strong soaking ability for being suited for some plants. By time, however, small particles in the ground chokes the pores of the wick so that the soaking ability of the wick successively is reduced or may even be stopped.

Further, the water tank substantially is only suited for being placed horizontally, and if the ground is slooping problems appear in that the water at one end of the tank is on a higher level than at the opposite end of the tank, and therefore there is a risk that the wick provides an uneven soaking up and distribution of water to different parts of the ground above the tank. Further there is a risk that the water, especially when refilling the tank with water, completely or partly flows out through a tank located on a high level and enters water tanks located on a lower level. In order to solve this problem the said German laid open publication suggests the introduction of special types of drain traps between the respective tanks when the cultivation plant is provided in slooping ground.

The previously known cultivation plants also are disadvantageous in that the water remains still-standing during relatively long periods of time what may lead to the formation and re-formation of harmful bacteria in the water. Further the water tanks have no supply of air and therefore the cultivation plants cannot assist in introducing oxygen into the ground above the water tanks. Also the known plants are formed so that the water tanks cannot receive excess of rain water, and at rain the ground above the water tanks may get to a strong moisture in that moisture is supplied both from the water tanks underneath the ground surface and from above by the rain.

Since further the water tanks are directly interconnected to each other and to water supply conduits the filling of the tanks are made successively from the highest located tank and further down to the subsequent tank or tanks. It is difficult to watch the filling of the tank, and in some previously known cultivation plants a tank located on a low level gets a substantially higher water pressure than the water tanks placed on a higher level.

The object of the invention therefore is to solve the problem of providing a cultivation plant comprising one or several water accumulators buried in the ground underneath the area to be irrigated and in which the water accumulators are formed so that they can be placed in any wanted position or levelling without the risk that the water accumulators get different water level at their ends or that a tank located on a low level gets a higher water pressure than a tank located on a higher level. The cultivation plant according to the invention further is designed so that each water accumulator is directly connected to a source for filling the tank with water. The water accumulator is a closed container which at the top and/or at the side thereof is formed with moisture distribution openings, and the closed container is filled with a porous, water-soaking substrate of a type which is capable of binding essential amounts of water. The cultivation plant further is formed so that the water accumulators are continuously maintained at a predetermined degree of moisture or alternatively so that the degree of moisture is increased when the degree of moisture in the tank has dropped to a predetermined bottom degree. Further the water accumulators are connected to means for introducing or pumping air into the accumulators, what both improves the introduction of oxygen into the irrigated ground and also prevents small particles in the ground or the earth to block the pores of the water soaking substrate. In a special embodiment of the invention a common water supply and air introducing means is used, whereby the water after the accumulators are given a predetermined degree of moisture is drained from the water supply conduit, whereafter air is introduced into the same conduit or is pumped through the same conduit.

Further characteristics of the invention will be evident from the following detailed specification in which reference will be made to the accompanying drawings.

In the drawings FIG. 1 diagrammatically shows a little portion of a cultivation plant according to the invention having several water accumulators and means for supplying water and air respectively to the water accumulators.

FIG. 2 is a longitudinal cross section through a water accumulator included in the cultivation plant.

FIGS. 3 and 4 show cross sections through two different alternative types of water accumulators.

Figure 5:
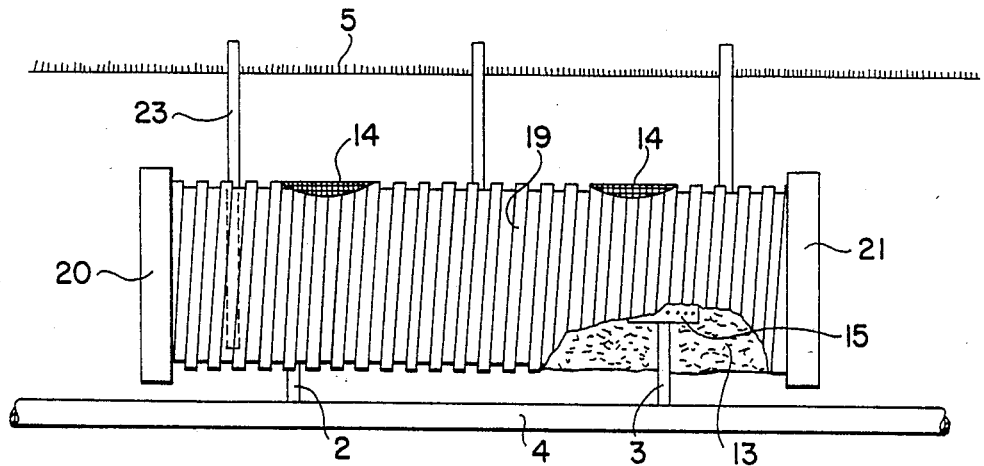
FIG. 5 is a side view of an alternative type of a water accumulator according to the invention and FIG. 6 is a top view of the water accumulator of FIG. 5.

The cultivation plant according to the invention shown in FIG. 1 comprises several separate water accumulators 1, which over two connection lines 2 and 3 are connected to a central water-air supply conduit 4. Both the water accumulators and the water-air supply conduit are burried under the surface 5 of the ground to be irrigated and oxygenated, and the water accumulators are placed anywhere on suitable places burried in the ground. In FIG. 1 is shown how some water accumulators are placed on a relatively even mutual distance whereas the distance may be increased if there is a large stone 6 of any other object in the ground. The water-air supply conduit 4 is connected to a central valve 7 having an inlet 8 for water, an inlet 9 for air and an outlet conduit 10 preferably for draining water.

As best evident from FIG. 2 each water accumulator 1 is a closed container 11 which at the top and/or at the side or sides is formed with moisture distribution openings 12. The container 11 is filled with a porous, water-soaking substrate 13 of a type which is capable of binding an essential amount of water. As example of suitable water-soaking substrates may be mentioned peat moss, mineral wool, glass wool and all kinds of synthetic material in the form of wood, fibres, porous cell plastic bodies or similar material. The substrate 13 completely fills the interior of the container 11 so that the substrate appears at the openings 14 of the container. The moisture distribution openings 12 of the container 11 are preferably located so that an even and suitable distribution of the moisture to the ground above and/or aside of the water accumulator 1 is obtained.

It should be noted that the container 11 may have any suitable size and form. In FIGS. 1 and 2 the container is illustrated as a circular-cylindrical container having three openings at the top. The container may, however, be made rectangular, square or of any other form, for instance as a flat cake having a large number of water distribution openings.

For the supply of water and/or air to the substrate 13 inside the container 11 the connection lines 2 and 3 preferably are formed with nozzles 15 providing a very finely distributed emittance of moisture and/or air to the water soaking substrate 13. The nozzles 15 can be placed anywhere in the container 11, but preferably they are placed fairly centrally so that a quick and even emittance and distribution of moisture and air is obtained in the substrate.

In the illustrated case the same conduit 4 is used both for supply of water and for supply of air, and preferably the supply of water and air is made alternating. It is, however, obvious that a first conduit can be used for supply of water and a second conduit for supply of air. There is also a possibility of supplying both water and air at the same time.

The porous, water-soaking substrate 13 ought to be of a type which is at least slightly bound or integrated so that the substrate is not forced out through the substrate openings 14 or otherwise is mixed with the earth adjacent the substrate openings.

In one embodiment of the invention which is diagrammatically illustrated in FIG. 3 conically formed portions of a substrate 16 are provided from the substrate openings 14 and downwards, which substrate 16 has a more bound or integrated structure or somewhat higher density than the remaining part of the substrate 13.

The common water-air supply conduit or the two separate conduits can be placed anywhere in the ground under, aside of and even above the water accumulators. In the embodiment according to FIG. 3 the container 11, however, is formed with a cavity 17 at the bottom, in which the water-air conduit 4 can be mounted and from which the connection lines 2 and 3 easily can be connected to the main conduit 4. In FIG. 4 an alternative embodiment of a water accumulator is shown in which the container 11' has a square cross section and in which the water-air supply conduit 4' is mounted in a cavity 17' at a side of the container 11'. In this case also is indicated the possibility of providing a grid 18 or similar means on top of the container 11' and that the entire container is kept open at the top.

In a suitable mood of manufacture the water accumulators are made in continuous lengths and are cut upon need, and if necessary or suitable they are closed at the two cut ends.

Figure 6:
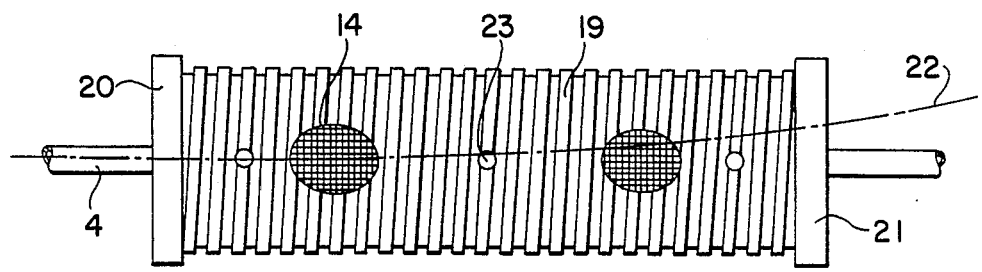

In FIGS. 5 and 6 there is shown an embodiment of a water accumulator which is preferably made at a continuous length and which is cut into suitable water accumulator length. The water accumulator comprises a body 19 which can be made of any type of metal or any type of synthetic resin and which in this case is spiral formed. At both ends the body 19 is closed with a lid 20 and 21 having inner threads and which is screw connected to the ends of the body. The water accumulator has two top openings 14 and it is connected to a water-/air supply conduit 4 by connection lines 2 and 3 each having a water distribution nozzle 15 inside the water soaking substrate 13 in the accumulator.

Preferably the body 19 is made so that the body can be bowed as indicated with the line 22 of FIG. 6. Further the body 19 can be formed with one or more top tubes 23 opening with their bottom ends adjacent the bottom of the accumulator body 19 and with the top end at a slight level above the ground level 5. The top tubes 23 can be used for providing a ventilation of the interior of the water accumulator or for blowing air or oxygen into the accumulator from above or for providing a humidity sensor in the water substrate 13 by introducing said sensor through the tube 23 from above.

Figure 7:
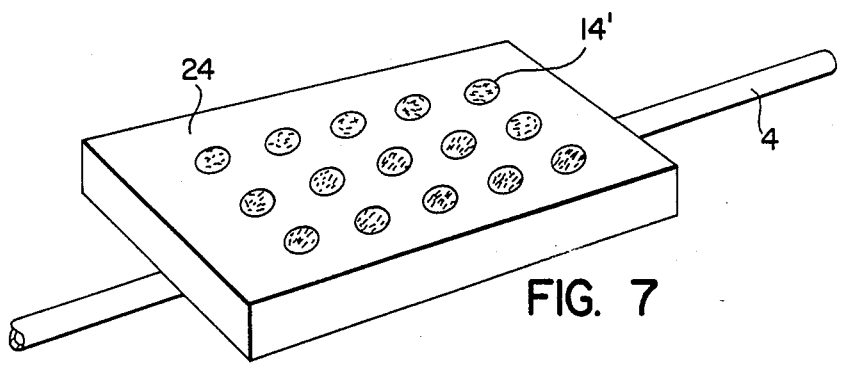
FIG. 7 is a still further embodiment of a water accumulator.

In FIG. 7 there is shown an embodiment of a water accumulator which is made like a flat container cake 24 having several top openings 14'.

When using the cultivation plant according to the invention the water accumulators 1 and the supply conduit or conduits 4 for water and air are buried in the ground underneath the ground area to be irrigated and oxygenated respectively. The valve 7 is adjusted so that water is fed to the porous water soaking substrate 13 over the conduit 4 and the connection lines 2 and 3 and via the nozzles 15 of said connection lines. Preferably at least one of the water accumulators has a hygrometer which can be read from outside. When the hygrometer indicates a suitable degree of moisture in the substrate the water supply is cut off and the water in the common water-air supply conduit 4 is drained through the outlet 10. Thereafter the valve 7 is adjusted so that air from the air inlet 9 is supplied through the conduit 4, the connection lines 2 and 3 and the nozzles 15. The air is supplied at a pressure which is slightly higher than the static pressure in the substrate, so that the air at some overpressure is forced through the substrande and into the irrigated earth which is thereby oxygenated. The air also contributes to at least slightly facilitate the distribution of water and vapour respectively from the substrate 13 through the substrate openings 14 and to the earth above and aside of the openings and to keep the pores of the substrate free from small earth particles.

When the hygrometer in the substrate 13 indicates that the degree of moisture has dropped to a predetermined lowest value the valve 7 is once again adjusted so that water is supplied and the substrate is re-moistened to the wanted maximum degree of moisture.

When using a cultivation plant comprising a separate water conduit and a separate air conduit basically the same method is utilized as the method described above. When the degree of moisture in the water accumulators has reached the predetermined maximum value the water conduit is shut and instead thereof the air conduit is opened so that air is fed through the substrate and into the irrigated earth.

By the alternating supply of moisture and reduction of the moisture in the substrate 13 a practically constant supply of moisture of the irrigated ground can be obtained upon need, or a pulsating supply of moisture and drying respectively can be obtained, which latter method imitates the nature at rain and subsequent dry periods. For certain purposes a constant irrigation may be wanted, for other purposes an alternating increase and reduction of moisture respectively is considered more suitable.

As mentioned above there is also a possibility of supplying water and air to the substrate 13 at the same time. This can be made in a common conduit or by two separate conduits to each water accumulator. It is obvious that the cultivation plant according to the invention also allows a supply of fertilizers or noxious combatting substances together with the water and/or the air.

It is to be understood that the above description and the embodiments of the invention shown in the drawings are only illustrating examples and that many modifications may be presented within the scope of the appended claims.

I claim:

1. An irrigation system comprising several separate water accumulator bodies (1) which are buried at suitable places and at suitable mutual distances and on any level in relation to each other underneath a ground area (5) in which artificially irrigated plants are to grow, and in which each water accumulator comprises a closed container having top, bottom and side walls (11) and having at least one moisture distribution opening (12) in at least one of said top and side walls, and in which each water accumulator is filled with a porous water-soaking substrate (13), characterized in that the irrigation system comprises a main conduit (4) having means (7-10) for supply under pressure of at least one of air (9), water (8) and both water and air concurrently and having means for draining (10) said main conduit (4), in that each water accumulator (11) is spaced above and in direct fluid communication with said main conduit (4) by at least one upwardly extending connection conduit (2, 3) and a nozzle (15) at the end of said connection conduit provided within the mass of water soaking substrate (13) and having openings in substantially all directions for finely distributing said at least one of air, water, and both air and water mixture in the water soaking substrate (13), and in that each water accumulator has at least one top tube (23) extending from the interior of the water accumulator to a level at least slightly above the ground level (5), said at least one top tube (23) can be used for ventilation of the water accumulator, for blowing air and oxygen into the water accumulator from above, and for introducing a humidity sensor in the substrate (13) of the water accumulator.

* * * * *